United States Patent
Sang et al.

(10) Patent No.: US 8,111,775 B2
(45) Date of Patent: Feb. 7, 2012

(54) COMMUNICATION DEVICE ADOPTED FOR MULTI-INPUT MULTI-OUTPUT ORTHOGONAL FREQUENCY DIVISION MULTIPLEXING SYSTEM AND METHOD THEREOF

(75) Inventors: Tzu-Hsien Sang, Hsinchu (TW); Yu-Jen Chang, Banqiao (TW)

(73) Assignee: Institute for Information Industry, Taipei (TW)

( * ) Notice: Subject to any disclaimer, the term of this patent is extended or adjusted under 35 U.S.C. 154(b) by 248 days.

(21) Appl. No.: 12/628,810

(22) Filed: Dec. 1, 2009

(65) Prior Publication Data

US 2011/0122961 A1 May 26, 2011

(30) Foreign Application Priority Data

Nov. 25, 2009 (TW) ................................ 98140120 A

(51) Int. Cl.
*H04B 7/02* (2006.01)
(52) U.S. Cl. ........................................................ 375/267
(58) Field of Classification Search .................. 375/141, 375/142, 147, 150, 260, 262, 265, 267, 343; 370/208, 335, 342, 441
See application file for complete search history.

(56) References Cited

U.S. PATENT DOCUMENTS

| 2008/0005219 A1* | 1/2008 | Nabar et al. | 709/201 |
| 2008/0229177 A1* | 9/2008 | Kotecha | 714/776 |

* cited by examiner

*Primary Examiner* — Young T. Tse
(74) *Attorney, Agent, or Firm* — Patterson Thuente Christensen Pedersen, P.A.

(57) ABSTRACT

A communication device adopted for a multi-input multi-output orthogonal frequency division multiplexing (MIMO-OFDM) system and a method thereof are provided. The MIMO-OFDM system comprises the communication device and a corresponding communication device, and they communicate with each other. The communication device comprises a transceiving module, a singular value decomposition (SVD) operation module, and an interpolation operation module. The transceiving module receives a channel state information (CSI) from the corresponding communication device, wherein the CSI comprises CSIs of a plurality of selected subcarriers. For each of the selected subcarriers, the SVD module performs an SVD decomposition operation on the channel matrix representing the CSI of the selected subcarrier to obtain a decomposed result, wherein the decomposed result comprises a beamforming matrix, an SVD matrix, and a decoding matrix. The interpolation operation module performs interpolations on the beamforming matrices of the selected subcarriers to derive beamforming matrices of the unselected subcarriers. The interpolation operation module performs interpolations on the decoding matrixes of the selected subcarriers to derive obtain decoding matrices of the unselected subcarriers.

22 Claims, 5 Drawing Sheets

COMMUNICATION DEVICE ADOPTED FOR MULTI-INPUT MULTI-OUTPUT ORTHOGONAL FREQUENCY DIVISION MULTIPLEXING SYSTEM AND METHOD THEREOF

This application claims priority to Taiwan Patent Application No. 098140120 filed on Nov. 25, 2009.

CROSS-REFERENCES TO RELATED APPLICATIONS

Not applicable.

BACKGROUND OF THE INVENTION

1. Field of the Invention

The present invention relates to a communication device adopted for a multi-input multi-output orthogonal frequency division multiplexing (MIMO-OFDM) system and a method thereof. More particularly, the communication device and the method thereof of the present invention utilize interpolation operations to reduce the number of singular value decomposition (SVD) operations performed on channel matrices in the MIMO-OFDM system.

2. Descriptions of the Related Art

As wireless communication technologies evolve, demands on quality and traffic of communication become ever higher. Nowadays, the multi-input multi-output orthogonal frequency division multiplexing (MIMO-OFDM) system has become one of the mainstream systems in the wireless communication sector. In industries, many wireless communication systems such as IEEE 802.11n (i.e., WiFi), IEEE 802.16 serial (i.e., WiMAX) and 3GPP LTE are based on the MIMO-OFDM system in terms of signal transmission.

The MIMO-OFDM system can use a beamforming matrix to equalize current communication channels into parallel data pipelines to result in significant improvement in the data transmission rate. A common practice is to perform singular value decomposition (SVD) operations on channel matrices of all subcarriers in the MIMO-OFDM system respectively. However, the number of subcarriers is usually relatively large, so performing SVD operations on channel matrices of all subcarriers directly would cause considerable time consumption and a huge amount of calculations.

Accordingly, an urgent need still exists in the art to reduce both the time and the calculation amount needed in performing SVD operations in the MIMO-OFDM system.

SUMMARY OF THE INVENTION

An objective of the present invention is to provide a communication device adopted for a multi-input multi-output orthogonal frequency division multiplexing (MIMO-OFDM) system and a method thereof. The communication device only needs to perform singular value decomposition (SVD) operations on channel matrices of selected subcarriers to obtain SVD matrices, and then perform interpolation operations on the SVD matrices of the selected subcarriers to derive SVD matrices of unselected subcarriers. Consequently, by means of the communication device and the method thereof of the present invention, both the time and calculation amount as needed in SVD operations in the prior art are reduced, thereby improving the operation efficiency of the MIMO-OFDM system.

To achieve the abovementioned objective, the communication device of the present invention comprises a transceiving module, an SVD operation module and an interpolation operation module. The transceiving module is configured to receive a channel state information (CSI) from a corresponding communication device that communicates with the communication device, wherein the CSI comprises a first CSI of a first subcarrier and a second CSI of a second subcarrier. The SVD operation module is configured to perform a matrix SVD operation on a first channel matrix representing the first CSI to obtain a first beamforming matrix, a first singular value matrix and a first decoding matrix. The SVD operation module is also configured to perform a matrix SVD operation on a second channel matrix representing the second CSI to obtain a second beamforming matrix, a second singular value matrix and a second decoding matrix. The interpolation operation module is configured to perform an interpolation operation on the first beamforming matrix and the second beamforming matrix to obtain a third beamforming matrix of a third subcarrier located between the first subcarrier and the second subcarrier. The interpolation operation module is also configured to perform an interpolation operation on the first decoding matrix and the second decoding matrix to obtain a third decoding matrix of the third subcarrier.

Furthermore, the method of the communication device adopted for the MIMO-OFDM system according to the present invention comprises the following steps of: (a) enabling the transceiving module to receive a CSI from the corresponding communication device, wherein the CSI comprises a first CSI of a first subcarrier and a second CSI of a second subcarrier; (b) enabling the SVD operation module to perform a matrix SVD operation on a first channel matrix representing the first CSI to obtain a first beamforming matrix, a first singular value matrix and a first decoding matrix; (c) enabling the SVD operation module to perform a matrix SVD operation on a second channel matrix representing the second CSI to obtain a second beamforming matrix, a second singular value matrix and a second decoding matrix; (d) enabling the interpolation operation module to perform an interpolation operation on the first beamforming matrix and the second beamforming matrix to obtain a third beamforming matrix of a third subcarrier that is located between the first subcarrier and the second subcarrier; and (e) enabling the interpolation operation module to perform an interpolation operation on the first decoding matrix and the second decoding matrix to obtain a third decoding matrix of the third subcarrier.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a communication device adopted for an MIMO-OFDM system and a method thereof.

The communication device and the method thereof of the present invention reduces the calculation amount needed in performing SVD operations in the MIMO-OFDM system by means of an interpolation operation approach, thereby improving the efficiency of obtaining beamforming matrices of the MIMO-OFDM system. The following embodiments are only provided to illustrate technical content of the present invention but not to limit scope of the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
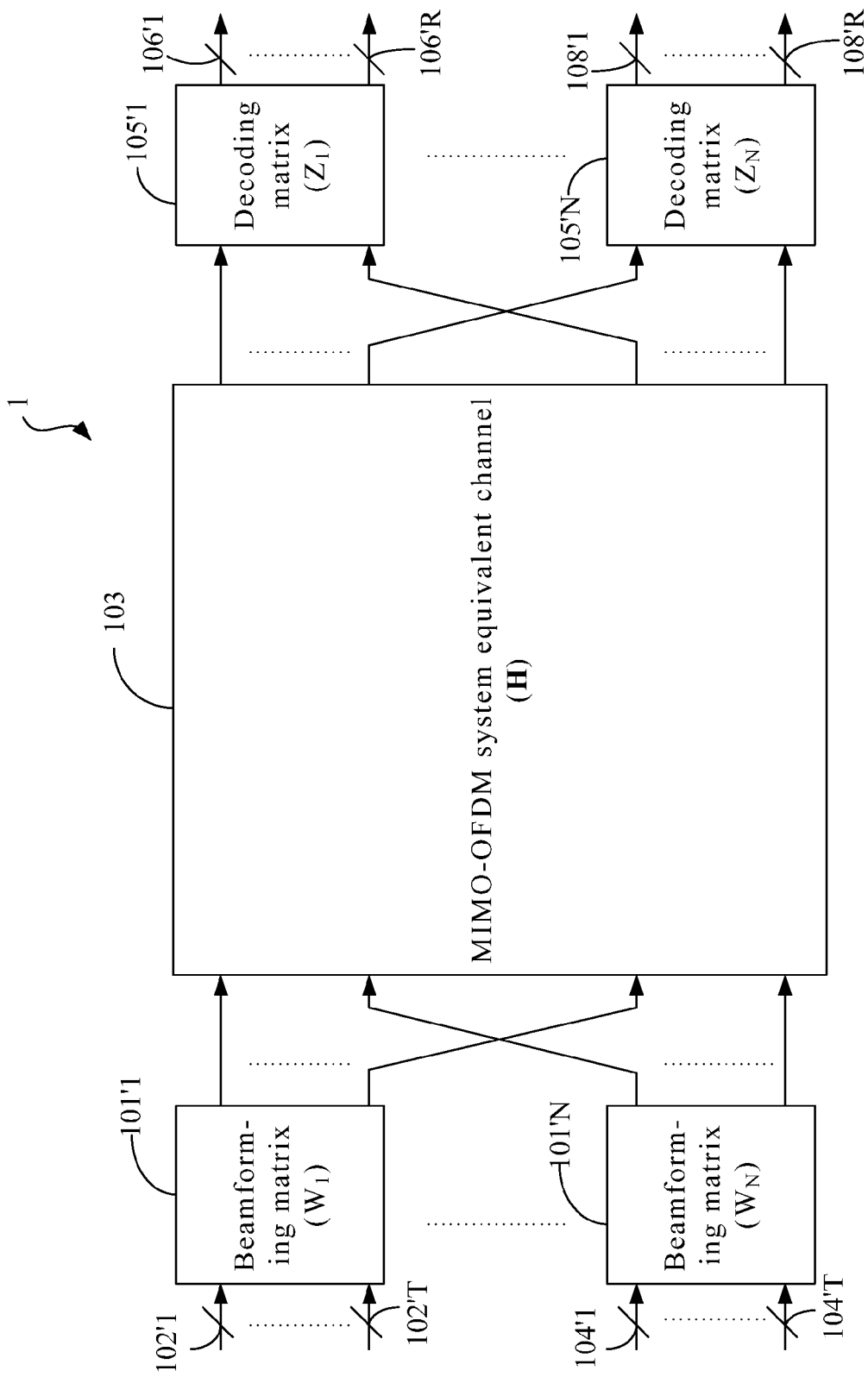
FIG. 1 is a schematic view illustrating operating concepts of an MIMO-OFDM system according to a first embodiment of the present invention.

FIG. 1 is a schematic view illustrating operating concepts of an MIMO-OFDM system 1 according to a first embodiment of the present invention. To describe the technical disclosure of the present invention more clearly, portions related to the prior art in the MIMO-OFDM system 1 are simplified and combined. More specifically, an inverse discrete Fourier transform (IDFT) module, a parallel to serial (P/S) converter and a plurality of antennas at a transmitting end of the MIMO-OFDM system 1, a DFT module, a serial to parallel (S/P) converter and a plurality of antennas at a receiving end of the MIMO-OFDM system 1, and transmission channels of the MIMO-OFDM system 1 are simplified into an MIMO-OFDM system equivalent channel 103. The MIMO-OFDM system equivalent channel 103 may be represented by a matrix H, elements of which are channel coefficients of the MIMO-OFDM system equivalent channel 103. Equivalent combinations represented by the MIMO-OFDM system equivalent channel 103 may be readily appreciated by those of ordinary skill in the art and, thus, will not be further described herein.

With the aforesaid simplification, operation of the MIMO-OFDM system 1 of the first embodiment may be explained as follows: information symbols 102'1, . . . , 102'T, . . . , 104'1, . . . , 104'T to be transmitted are encoded by the transmitting end using N beamforming matrices 101'1, . . . , 101'N, then be processed by the MIMO-OFDM system equivalent channel 103, and finally decoded by the receiving end using N decoding matrices 105'1, . . . , 105'N to obtain received signals 106'1, . . . , 106'R, . . . , 108'1, . . . , 108'R. More specifically, each of the beamforming matrices 101'1, . . . , 101'N performs a matrix operation (i.e., encoding operation) on information symbols of a respective input by using matrices $W_1, \ldots, W_N$ respectively and each of the decoding matrices 105'1, . . . , 105'N performs a matrix operation (i.e., a decoding operation) on the respective input by using matrices $Z_1, \ldots, Z_N$ respectively. Here, N represents the number of subcarriers in the MIMO-OFDM system 1, where N has a value of $2^n$, and n is a positive integer. The DFT (or IDFT) in the MIMO-OFDM system 1 also has a point number of N. It shall be particularly noted that, due to restriction by the paper size, only two beamforming matrices 101'1, 101'N among the N beamforming matrices and two decoding matrices 105'1, 105'N among the N decoding matrices are depicted in FIG. 1, with other matrices being omitted from depiction.

Assuming that the number of antennas at the transmitting end of the MIMO-OFDM system 1 is T, and the number of antennas at the receiving end is R. Information symbols 102'1, . . . , 102'T, . . . , 104'1, . . . , 104'T encoded by the beamforming matrices 101'1, . . . , 101'N may be represented as $I_{a,b}$, where a is a positive integer from 1 to T, b is a positive integer from 1 to N; received signals 106'1, . . . , 106'R, . . . , 108'1, . . . , 108'R obtained through decoding by use of the decoding matrices 105'1, . . . , 105'N may be represented as $r_{c,d}$, where c is a positive integer from 1 to R and d is a positive integer from 1 to N. The information symbol $I_{a,b}$ corresponds to a signal transmitted by the $a^{th}$ antenna of the transmitting end on the $b^{th}$ subcarrier, and the received signal $r_{c,d}$ corresponds to a signal received by the $c^{th}$ antenna of the receiving end on the $d^{th}$ subcarrier. More specifically, the information symbols 102'1, . . . , 102'T (which may be represented as $I_{1,1}, \ldots, I_{T,1}$) are encoded by the beamforming matrix 101'1 using the matrix $W_1$, and the information symbols 104'1, . . . , 104'T (which may be represented as $I_{1,N}, \ldots, I_{T,N}$) are encoded by the beamforming matrix 101'N using the matrix $W_N$. The received signals 106'1, . . . , 106'R (which may be represented as $r_{1,1}, \ldots, r_{R,1}$) are decoded by the decoding matrix 105'1 using the matrix $Z_1$, and the received symbols 108'1, . . . , 108'R (which may be represented as $r_{1,N}, \ldots, r_{R,N}$) are decoded by the decoding matrix 105'N using the matrix $Z_N$.

Furthermore, in the MIMO-OFDM system 1, a signal received on the $k^{th}$ subcarrier may be represented by the following Equation 1:

$$\underline{r}_k = Z_k^H \{H_k W_k \underline{I}_k + \underline{n}_k\} \quad \text{(Equation 1)}$$

where, the vector $\underline{I}_k$ represents a set of information symbols $I_{1,k}, \ldots, I_{T,k}$ that are encoded by the $k^{th}$ beamforming matrix $W_k$ and transmitted by the $1^{st}$ to $T^{th}$ antenna at the transmitting end, the matrix $H_k$ represents a subset of the MIMO-OFDM system equivalent channel 103 (matrix H) corresponding to the $k^{th}$ subcarrier, the vector $\underline{n}_k$ represents a noise set corresponding to the $k^{th}$ subcarrier and received by the $1^{st}$ to $R^{th}$ antennas at the receiving end, the vector $\underline{r}_k$ represents a set of received symbols $r_{1,k}, \ldots, r_{R,k}$ that are received by the $1^{st}$ to $R^{th}$ antennas at the receiving end and decoded by the $k^{th}$ decoding matrix $Z_k$, and $(\bullet)^H$ represents a Hermitian transformation.

Generally speaking, the MIMO-OFDM system 1 executes a channel measurement process at the receiving end; i.e., by transmitting a known signal from the transmitting end, the receiving end may estimate the matrix H according to the known signal and transmit the matrix H to the transmitting end, where elements of the matrix H are channel state information (CSI). Thereafter, the transmitting end and the receiving end may, respectively, retrieve from the matrix H a matrix $H_k$ corresponding to the $k^{th}$ subcarrier and perform singular value decomposition (SVD) operations thereon to obtain the following Equation 2:

$$H_k = U_k S_k V_k^H \quad \text{(Equation 2)}$$

where, the matrix $S_k$ is a singular value matrix corresponding to the matrix $H_k$ and is a diagonal matrix whose diagonal elements are in a descending order, and both the matrix $U_k$ and $V_k$ are a unitary matrix. Thereby, the signal transmission complexity of the MIMO-OFDM system 1 may be reduced simply by designing the $k^{th}$ beamforming matrix (i.e., the beamforming matrix $W_k$) as the matrix $V_k$ and designing the $k^{th}$ decoding matrix (i.e., the decoding matrix $Z_k$) as the matrix $U_k$. This will be explained with reference to the following Equation 3:

$$\begin{aligned} \underline{r}_k &= Z_k^H \{H_k W_k \underline{I}_k + \underline{n}_k\} \\ &= Z_k^H \{U_k S_k V_k^H W_k \underline{I}_k + \underline{n}_k\} \\ &= U_k^H \{U_k S_k V_k^H V_k \underline{I}_k + \underline{n}_k\} \\ &= S_k \underline{I}_k + U_k^H \underline{n}_k \end{aligned} \quad \text{(Equation 3)}$$

As shown in Equation 3, when the beamforming matrix $W_k$ is designed as the matrix $V_k$ and the decoding matrix $Z_k$ is designed as the matrix $U_k$, because the singular value matrix $S_k$ is a diagonal matrix, elements of the set of received signals (i.e., the vector $r_k$) and those of the set of information symbols (i.e., the vector $\bar{I}_k$) corresponding to the $k^{th}$ subcarrier may be viewed to have a one-to-one correspondence relationship.

Performing SVD operations on the channel matrix $H_k$ corresponding to the $k^{th}$ subcarrier respectively can simplify the signal transmission complexity, but as the number of subcarriers (i.e., N) of the MIMO-OFDM system 1 is typically designed to range between $2^6$ and $2^{11}$, the number of SVD operations that need to be performed is very huge. This leads to considerable time consumption and calculation amount in the MIMO-OFDM system 1. For example, if N=1024, then 1024 SVD operations must be performed for each signal transmission. Accordingly, this problem is just what to be solved by the present invention.

Figure 2:
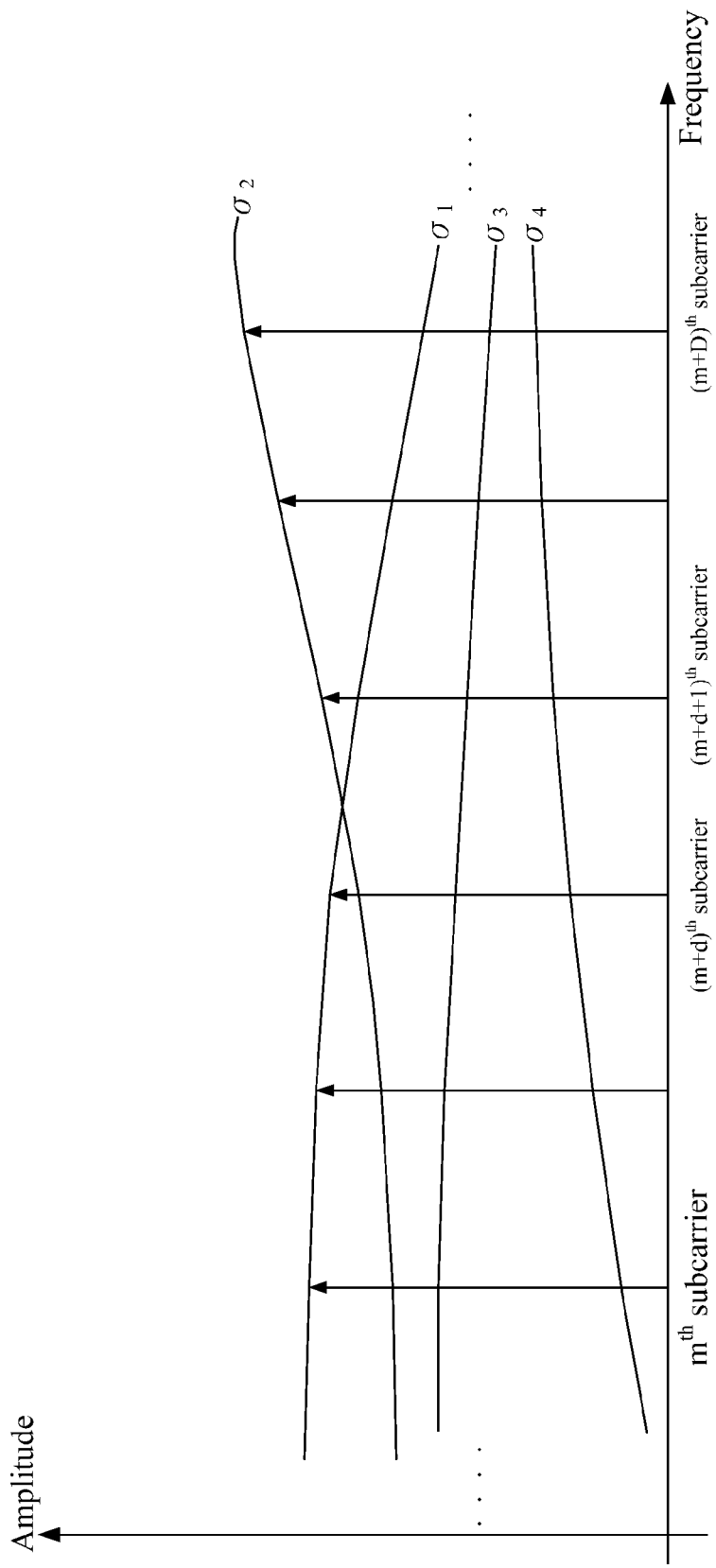
FIG. 2 is a schematic view illustrating relationships between singular values of subcarriers in the MIMO-OFDM system of the first embodiment.

Referring next to FIG. 2, relationships of singular values of channel matrices between adjacent subcarriers are shown therein, where a horizontal axis represents the frequency and a vertical axis represents the amplitude. As shown in FIG. 2, in most cases, singular values of channel matrices between adjacent subcarriers are highly correlated (e.g., in a linear relationship). Thus, the present invention will solve the problem of causing a considerable calculation amount when performing SVD operations on all subcarrier matrices ($H_k$) on basis of this correlation.

Figure 3:
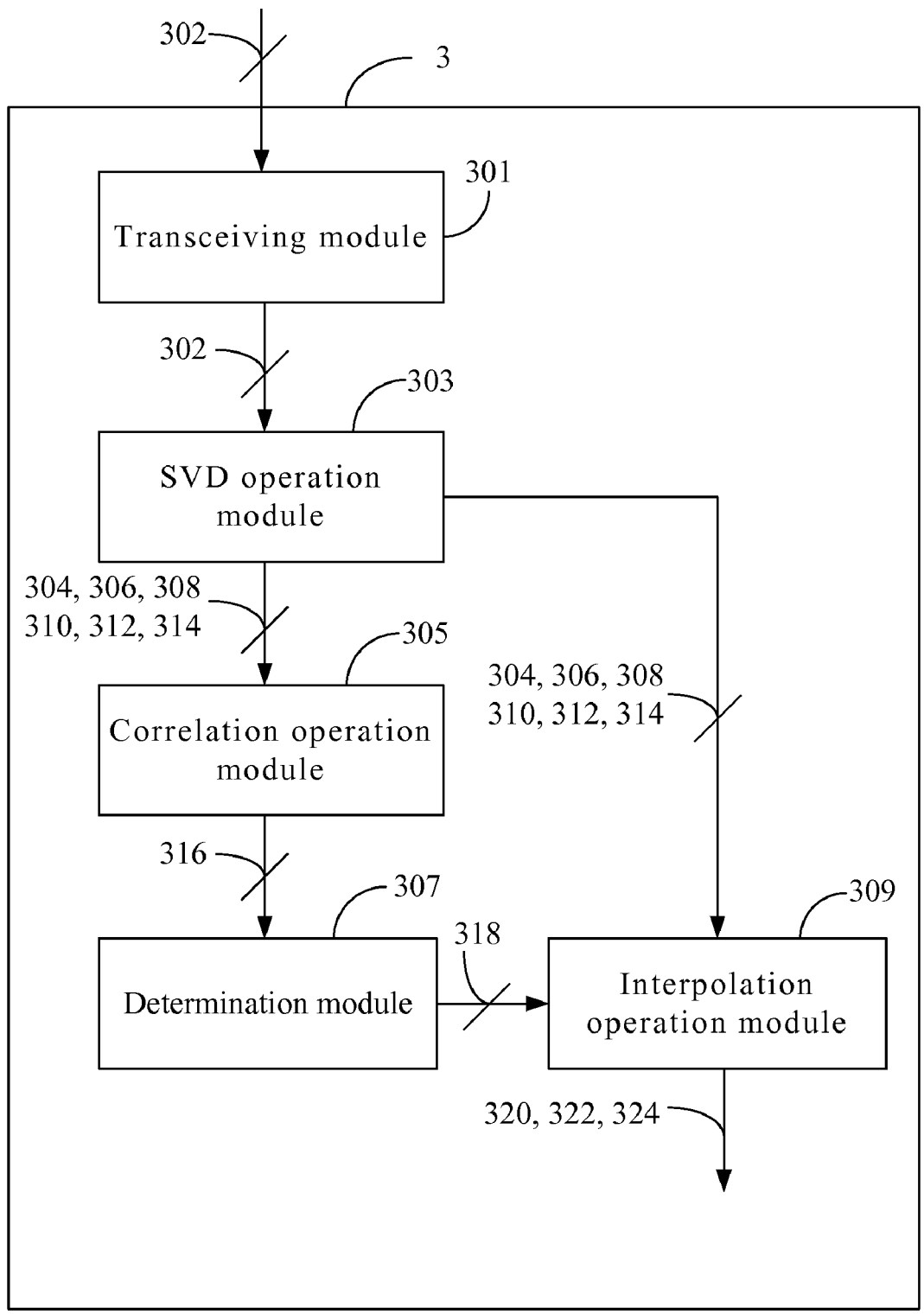
FIG. 3 is a schematic view of a communication device of the first embodiment.

FIG. 3 is a communication device 3 for the MIMO-OFDM system 1 in the first embodiment of the present invention. It shall be noted that, in this embodiment, the communication device 3 acts as a transmitting end in the MIMO-OFDM system 1; however, in other embodiments, the communication device 3 may also act as a receiving end, in which case the CSIs (elements of the matrix H) are obtained by executing a channel measurement process in itself.

The communication device 3 comprises a transceiving module 301, a SVD operation module 303, a correlation operation module 305, a determination module 307 and an interpolation operation module 309. The transceiving module 301 receives a CSI 302 (i.e., the aforesaid matrix H and elements thereof) from a corresponding communication device (a receiving end of the MIMO-OFDM system 1). The CSI 302 comprises a first CSI (represented in a matrix form as $H_m$) of a first subcarrier (which is assumed to be the $m^{th}$ subcarrier shown in FIG. 2) and a second CSI (represented in a matrix form as $H_{m+D}$) of a second subcarrier (which is assumed to be the $(m+D)^{th}$ subcarrier shown in FIG. 2).

Next, an SVD operation is performed by the SVD operation module 305 on a first channel matrix ($H_m$) representing the first CSI to obtain a first beamforming matrix 304 ($W_m = V_m$), a first singular value matrix 306 ($S_m$) and a first decoding matrix 308 ($Z_m = U_m$). Also, an SVD operation is performed by the SVD operation module 305 on a second channel matrix ($H_{m+D}$) representing the second CSI to obtain a second beamforming matrix 310 ($W_{m+D} = V_{m+D}$), a second singular value matrix 312 ($S_{m+D}$) and a second decoding matrix 314 ($Z_{m+D} = U_{m+D}$).

Afterwards, a correlation coefficient 316 between the first CSI and the second CSI is calculated by the correlation operation module 305 according to the first channel matrix ($H_m$) and the second channel matrix ($H_{m+D}$). For example, the correlation operation module 305 may calculate the correlation coefficient 316 according to the first decoding matrix 308 ($U_m$) of the first channel matrix ($H_m$) and the second decoding matrix 314 ($U_{m+D}$) of the second channel matrix ($H_{m+D}$). For example, a matrix inner product operation is performed on the first decoding matrix 308 ($U_m$) and the second decoding matrix 314 ($U_{m+D}$) to derive a correlation matrix ($T_{m,m+D} \equiv U_m^H U_{m+D}$). In this case, the correlation coefficient 316 comprises a plurality of diagonal elements of the correlation matrix $T_{m,m+D}$. It shall be appreciated that, in other examples, the correlation operation module 305 may calculate the correlation coefficient according to other information (e.g., the first beamforming matrix 304 ($W_m = V_m$) and the second beamforming matrix 310 ($W_{m+D} = V_{m+D}$)) of the first channel matrix ($H_m$) and the second channel matrix ($H_{m+D}$). If the first beamforming matrix 304 ($W_m = V_m$) and the second beamforming matrix 310 ($W_{m+D} = V_{m+D}$) are used to calculate the correlation coefficient, an inner product operation may be performed on the two matrices to generate a correlation matrix, and the correlation coefficient comprises a plurality of diagonal elements of the correlation matrix.

Next, the determination module 307 determines whether the correlation coefficient 316 is less than a specific value (i.e., determining whether none of the diagonal elements of the correlation matrix $T_{m,m+D}$ is less than the specific value, e.g., 0.75). If it is determined that the correlation coefficient 316 is not less than the specific value, it means that the first channel matrix ($H_m$) and the second channel matrix ($H_{m+D}$) are highly correlated. Then, according to the correlation coefficient 316, an interpolation operation is performed by the interpolation operation module 309 on the first beamforming matrix 304 ($W_m = V_m$) and the second beamforming matrix 310 ($W_{m+D} = V_{m+D}$) to obtain a third beamforming matrix 320 ($W_{m+d}$) of a third subcarrier (e.g., the $(m+d)^{th}$ subcarrier shown in FIG. 2) located between the first subcarrier (the $m^{th}$ subcarrier shown in FIG. 2) and the second subcarrier (the $(m+D)^{th}$ subcarrier shown in FIG. 2). Also, according to the correlation coefficient 316, an interpolation operation is performed by the interpolation operation module 309 on the first decoding matrix 308 ($Z_m = U_m$) and the second decoding matrix 314 ($Z_{m+D} = U_{m+D}$) to obtain a third decoding matrix 324 ($Z_{m+d}$) of the third subcarrier (e.g., the $(m+d)^{th}$ subcarrier shown in FIG. 2).

In following description, an interpolation approach adopted by the interpolation operation module 309 to perform interpolation operations will be illustrated. In other examples, the interpolation operation module 309 may also use other interpolation operation approaches. In more detail, when d ranges between 0 and D/2, the interpolation operation module 309 calculates a beamforming phase rotation matrix ($\Phi_{m,m+D,d}$) according to the first beamforming matrix 304 ($W_m = V_m$) and the second beamforming matrix 310 ($W_{m+D} = V_{m+D}$), and then performs a matrix multiplication operation on the first beamforming matrix 304 ($W_m = V_m$) and the beamforming phase rotation matrix ($\Phi_{m,m+D,d}$) to obtain a result for use as the third beamforming matrix ($W_{m+d}$). On the other hand, when d ranges between D/2 and D, the interpolation operation module 309 calculates a beamforming phase rotation matrix ($\Phi_{m+D,m,d}$) to the first beamforming matrix 304 ($W_m = V_m$) and the second beamforming matrix 310 ($W_{m+D} = V_{m+D}$), and then performs a matrix multiplication operation on the second beamforming matrix 310 ($W_{m+D} = V_{m+D}$) and the beamforming phase rotation matrix ($\Phi_{m+D,m,d}$) to obtain a result for use as the third beamforming matrix ($W_{m+d}$). Values of the beamforming phase rotation matrix ($\Phi_{m+D,m,d}$) and the beamforming phase rotation matrix ($\Phi_{m+D,m,d}$) are as shown in the following Equation 4:

$$\Phi_{i,j,d} = \text{diag}(e^{j\theta_{i,j,d,1}}, e^{j\theta_{i,j,d,2}}, \ldots, e^{j\theta_{i,j,d,M}}) \quad \text{(Equation 4)}$$

where, for simplification of the description, it is assumed that M=T=R herein, i.e., the transmitting end has the same number of antennas as the receiving end; additionally, the $p^{th}$ value along the diagonal of $\Phi_{i,j,d}$ may be represented by the following Equation 5:

$$\theta_{i,j,d,p} = \begin{cases} \pm \dfrac{d\tan^{-1}\left(\dfrac{|\text{imag}(v_{p,i}^H v_{q,j})|}{|\text{real}(v_{p,i}^H v_{q,j})|}\right)}{D}, & j > i \\ \pm \dfrac{(D-d)\tan^{-1}\left(\dfrac{|\text{imag}(v_{p,i}^H v_{q,j})|}{|\text{real}(v_{p,i}^H v_{q,j})|}\right)}{D}, & i > j \end{cases} \quad \text{(Equation 5)}$$

where, the vector $v_{q,j}$ represents a $q^{th}$ row vector of a beamforming matrix ($W_j$) corresponding to the $j^{th}$ subcarrier, the vector $v_{p,i}$ represents a $p^{th}$ row vector of a beamforming matrix ($W_i$) corresponding to the $i^{th}$ subcarrier, and the vector $v_{q,j}$ and the vector $v_{p,i}$ (i.e., the $p^{th}$ row vector corresponding to the $i^{th}$ subcarrier) are highly correlated. Therefore, the third beamforming matrix ($W_{m+d}$) is as shown by the following Equation 6:

$$W_{m+d} = \begin{cases} V_m \Phi_{m,m+D,d}, & 0 < d < D/2 \\ V_{m+D} \Phi_{m+D,m,d}, & D/2 < d < D \\ V_{m+d}, & d = 0, D \end{cases} \quad \text{(Equation 6)}$$

Similarly, when d ranges between 0 and D/2, the interpolation operation module 309 calculates a decoding phase rotation matrix ($\Theta_{m,m+D,d}$) according to the first decoding matrix 308 ($Z_m = U_m$) and the second decoding matrix 314 ($Z_{m+D} = U_{m+D}$), and then performs a matrix multiplication operation on the first decoding matrix 308 ($Z_m = U_m$) and the decoding phase rotation matrix ($\Theta_{m+D,m,d}$) to obtain a result for use as the third decoding matrix ($Z_{m+d}$). On the other hand, when d ranges between D/2 and D, the interpolation operation module 309 calculates a decoding phase rotation matrix ($\Theta_{m+D,m,d}$) according to the first decoding matrix 308 ($Z_m = U_m$) and the second decoding matrix 314 ($Z_{m+D} = U_{m+D}$), and then performs a matrix multiplication operation on the second decoding matrix 314 ($Z_{m+D} = U_{m+D}$) and the decoding phase rotation matrix ($\Theta_{m,m+D,d}$) to obtain a result for use as the third decoding matrix ($Z_{m+d}$). Values of the decoding phase rotation matrix ($\Theta_{m,m+D,d}$) and the decoding phase rotation matrix ($\Theta_{m+D,m,d}$) are as shown in the following Equation 7:

$$\Theta_{i,j,d} = \text{diag}(e^{j\theta_{i,j,d,1}}, e^{j\theta_{i,j,d,2}}, \ldots e^{j\theta_{i,j,d,M}}) \quad \text{(Equation 7)}$$

where, the $p^{th}$ value along the diagonal of $\Theta_{i,j,d}$ may be represented by the following Equation 8:

$$\theta_{i,j,d,p} = \begin{cases} \pm \dfrac{d\tan^{-1}\left(\dfrac{|\text{imag}(u_{p,i}^H u_{q,j})|}{|\text{real}(u_{p,i}^H u_{q,j})|}\right)}{D}, & j > i \\ \pm \dfrac{(D-d)\tan^{-1}\left(\dfrac{|\text{imag}(u_{p,i}^H u_{q,j})|}{|\text{real}(u_{p,i}^H u_{q,j})|}\right)}{D}, & i > j \end{cases} \quad \text{(Equation 8)}$$

where, the vector $u_{q,j}$ represents a $q^{th}$ row vector of a decoding matrix ($U_j$) corresponding to the $j^{th}$ subcarrier, the vector $u_{p,i}$ represents a $p^{th}$ row vector of a decoding matrix ($U_i$) corresponding to the $i^{th}$ subcarrier, and the vector $u_{q,j}$ and the vector $u_{p,i}$, are highly correlated. Therefore, the third decoding matrix ($Z_{m+d}$) is as shown by the following Equation 9:

$$Z_{m+d} = \begin{cases} U_m \Theta_{m,m+D,d}, & 0 < d < D/2 \\ U_{m+D} \Theta_{m+D,m,d}, & D/2 < d < D \\ U_{m+d}, & d = 0, D \end{cases} \quad \text{(Equation 9)}$$

On the other hand, if the determination module 307 determines that the correlation coefficient is less than the specific value (i.e., one of the diagonal elements of the correlation matrix is less than the specific value, for example, when the specific value is 0.75, one of the diagonal elements of the correlation matrix is 0.45), the interpolation operation module 309 calculates a permutation matrix 318 and then performs a matrix multiplication operation on the third beamforming matrix calculated in Equation 6 and the permutation matrix 318 to update the third beamforming matrix, as shown in the following Equation 10:

$$W_{m+d} = \begin{cases} V_m \Phi_{m,m+D,d} P_{m,m+D,d}, & 0 < d < D/2 \\ V_{m+D} \Phi_{m+D,m,d} P_{m+D,m,d}, & D/2 < d < D \\ V_{m+d}, & d = 0, D \end{cases} \quad \text{(Equation 10)}$$

where, the matrix $P_{m,m+D,d}$ and the matrix $P_{m+D,m,d}$ are the aforesaid permutation matrix 318. The permutation matrix 318 is a column-swapping matrix, which is mainly used to adjust the sequence of column vectors of the beamforming phase rotation matrix if singular values of adjacent subcarriers are swapped in their sequences when linear changes occur. As shown in FIG. 2, singular values $\sigma_1$ and $\sigma_2$ of a singular value matrix corresponding to the $(m+d)^{th}$ subcarrier and singular values $\sigma_1$ and $\sigma_2$ of a singular value matrix corresponding to the $(m+d+1)^{th}$ subcarrier become interleaved with each other when linear changes occur, causing elements of the singular value matrix corresponding to the $(m+d)^{th}$ subcarrier and those of the singular value matrix corresponding to the $(m+d+1)^{th}$ subcarrier to be interleaved with each other. Therefore, if some adjacent ones of the diagonal elements (i.e., the correlation coefficient 316) of the correlation matrix ($T_{m,m+D} = U_m^H U_{m+D}$) are less than the specific value (e.g., 0.75), then the permutation matrix may be determined according to positions of these adjacent diagonal elements. For example, the relationship between the correlation matrix ($T_{m+d,m+d+1}$) and the permutation matrix ($P_{m,m+D,d+1}$) may be represented as follows:

$$\text{if } T_{m+d,m+d+1} = \begin{bmatrix} 0.9 & \times & \times & \times \\ \times & 0.15 & \times & \times \\ \times & \times & 0.14 & \times \\ \times & \times & \times & 0.89 \end{bmatrix},$$

$$\text{then } P_{m,m+D,d+1} = \begin{bmatrix} 1 & 0 & 0 & 0 \\ 0 & 0 & 1 & 0 \\ 0 & 1 & 0 & 0 \\ 0 & 0 & 0 & 1 \end{bmatrix},$$

where the $P_{m,m+D,d+1}$ matrix is a permutation matrix for swapping the second column vector with the third column vector.

Similarly, a matrix multiplication operation is also performed by the interpolation operation module 309 on the third decoding matrix calculated in Equation 9 and the permutation matrix to update the third decoding matrix, as shown in the following Equation 11:

$$Z_{m+d} = \begin{cases} U_m \Theta_{m,m+D,d} P_{m,m+D,d}, & 0 < d < D/2 \\ U_{m+D} \Theta_{m+D,m,d} P_{m+D,m,d}, & D/2 < d < D \\ U_{m+d}, & d = 0, D \end{cases}$$ (Equation 11)

It shall be noted that, in other examples, if a lower requirement is imposed on communication quality, the correlation operation module 305 and the determination module 307 may be omitted in the communication device. In this case, the interpolation operation may be performed directly by the interpolation operation module without considering the correlation between the first subcarrier and the second subcarrier.

It can be known from the above description that, for all subcarriers located between the first subcarrier (e.g., the $m^{th}$ subcarrier shown in FIG. 2) and the second subcarrier (the $(m+D)^{th}$ subcarrier shown in FIG. 2), the communication device 3 of the first embodiment may obtain decoding matrices and beamforming matrices of these subcarriers through interpolation operations without performing SVD operations thereon so that subsequent signal transmissions can be made by the communication device 3.

Figure 4A:
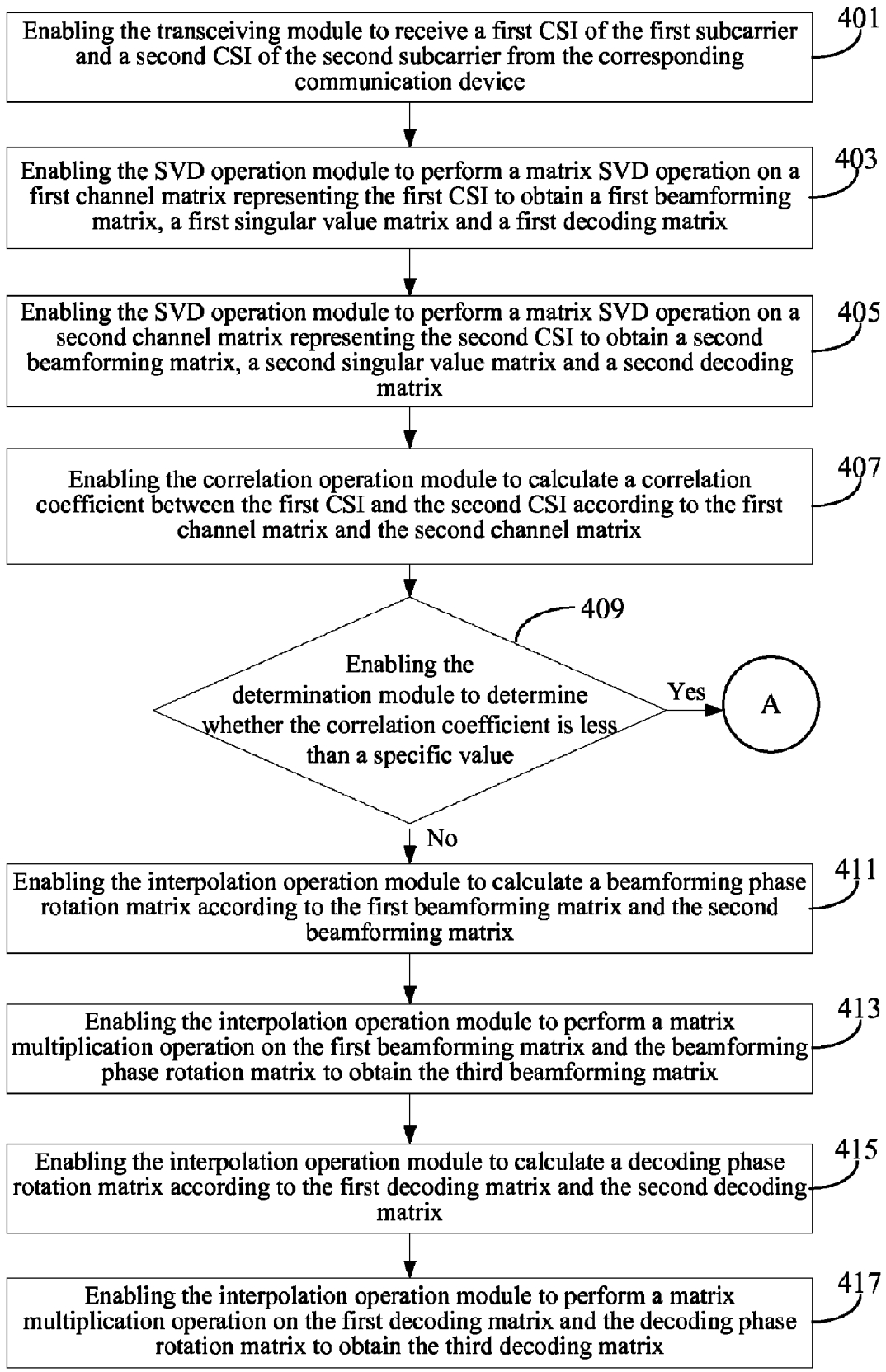
FIGS. 4A-B are a flowchart of a method for the communication device of the first embodiment.
Figure 4B:
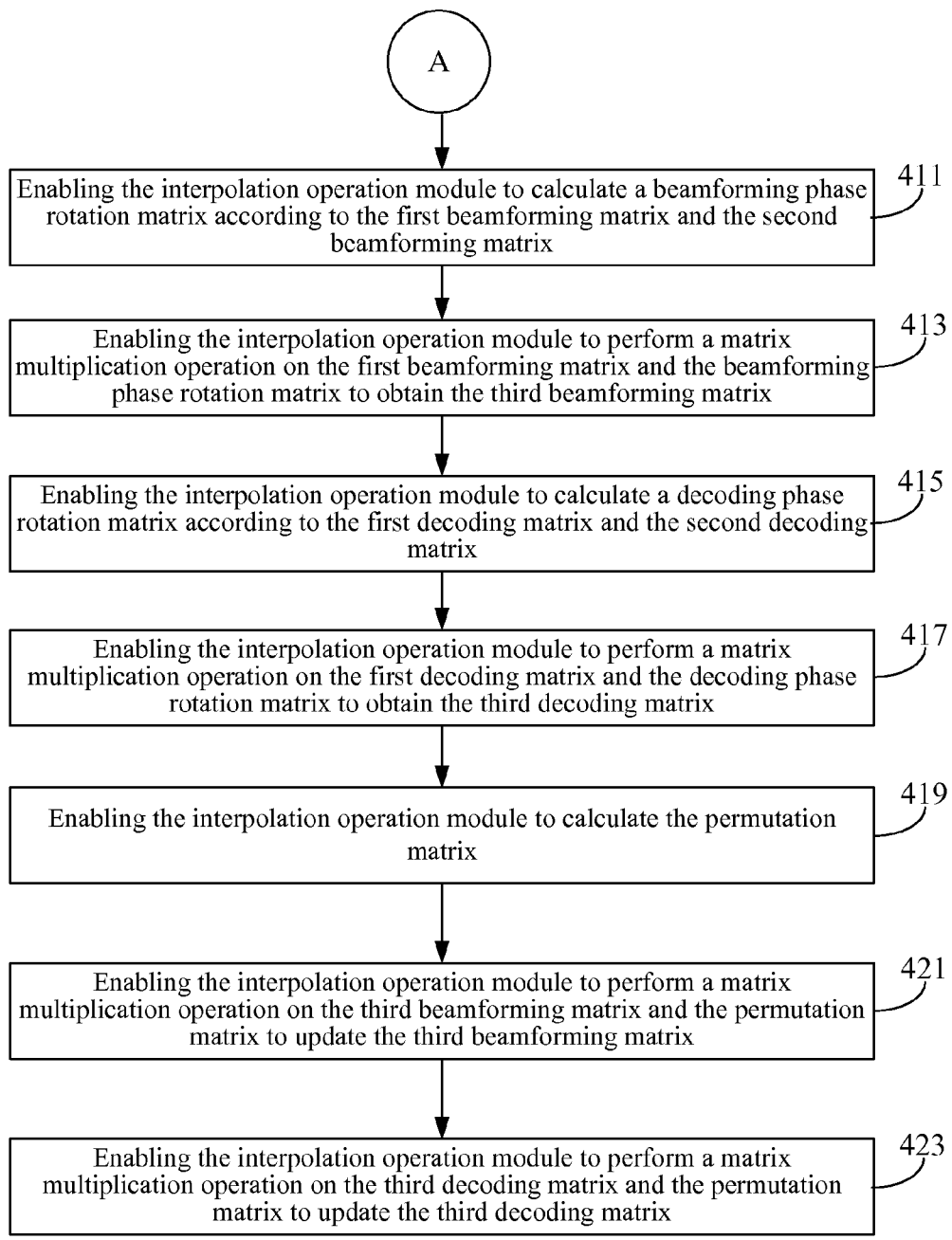

FIGS. 4A-B show a flowchart of a method for a communication device (e.g., the communication device 3 of the first embodiment) of the present invention. Firstly, step 401 is executed to enable the transceiving module 301 to receive a CSI 302 from the corresponding communication device, wherein the CSI 320 comprises a first CSI of the first subcarrier and a second CSI of the second subcarrier. Then, step 403 is executed to enable the SVD operation module 303 to perform a SVD operation on a first channel matrix representing the first CSI to obtain a first beamforming matrix 304, a first singular value matrix 306 and a first decoding matrix 308, and step 405 is executed to perform a SVD operation on a second channel matrix representing the second CSI to obtain a second beamforming matrix 310, a second singular value matrix 312 and a second decoding matrix 314.

Next, step 407 is executed to enable the correlation operation module 305 to calculate a correlation coefficient between the first CSI and the second CSI according to the first channel matrix and the second channel matrix. Afterwards, step 409 is executed to enable the determination module 307 to determine whether the correlation coefficient is less than a specific value. If the determination module 307 determines that the correlation coefficient is not less than the specific value, then this method proceeds to step 411 and step 413 to perform an interpolation operation on the first beamforming matrix 304 and the second beamforming matrix 310 to obtain a third beamforming matrix corresponding to a third subcarrier located between the first subcarrier and the second subcarrier. More specifically, step 411 is executed to enable the interpolation operation module 309 to calculate a beamforming phase rotation matrix according to the first beamforming matrix 304 and the second beamforming matrix (i.e., as shown in Equation 4), and then step 413 is executed to enable the interpolation operation module 309 to perform a matrix multiplication operation on the first beamforming matrix 304 and the beamforming phase rotation matrix to obtain the third beamforming matrix.

Thereafter, this method proceeds to step 415 and step 417 to perform an interpolation operation on the first decoding matrix 308 and the second decoding matrix 314 to obtain a third decoding matrix of the third subcarrier. More specifically, step 415 is executed to enable the interpolation operation module 309 to calculate a decoding phase rotation matrix according to the first decoding matrix 308 and the second decoding matrix 314 (i.e., as shown in Equation 7), and then step 417 is executed to enable the interpolation operation module 309 to perform a matrix multiplication operation on the first decoding matrix 308 and the decoding phase rotation matrix to obtain the third decoding matrix.

It shall be particularly noted that, as described in the first embodiment, depending on distances (d) from the third subcarrier to the first subcarrier and the second subcarrier, the third beamforming matrix may also be obtained by performing a matrix multiplication operation on the second beamforming matrix 310 and the beamforming phase rotation matrix, and the third decoding matrix may also be obtained by perform a matrix multiplication operation on the second decoding matrix 314 and the decoding phase rotation matrix. Furthermore, the approaches to obtain the beamforming phase rotation matrix and the decoding phase rotation matrix in the present invention are not merely limited to what shown in Equations 4 and 7; rather, in other embodiments, other interpolation approaches may also be used to obtain the beamforming phase rotation matrix and the decoding phase rotation matrix. Based on the technical disclosures described in the present invention, those of ordinary skill in the art may readily use other interpolation approaches to obtain the beamforming phase rotation matrix and the decoding phase rotation matrix, and this will not be further described herein.

If it is determined by the determination module 307 that the correlation coefficient is less than the specific value, then step 411 to step 417 are executed at first. Thereafter, step 419 is executed to enable the interpolation operation module 309 to calculate the permutation matrix 318. Afterwards, step 421 and step 423 are executed to enable the interpolation operation module 309 to perform a matrix multiplication operation on the third beamforming matrix and the permutation matrix 318 to update the third beamforming matrix (as shown in Equation 10), and perform a matrix multiplication operation on the third decoding matrix and the permutation matrix 318 to update the third decoding matrix (as shown in Equation 11).

The communication device and the method thereof disclosed in the present invention need only about $$\frac{M^3 N}{D}$$

multiplication operations in order to obtain beamforming matrices and decoding matrices of all the subcarriers, where M represents the number of antenna, N represents the number of subcarriers and D represents interpolation spacing. In contrast, the conventional method that performs SVD operations on all subcarriers needs about $M^3 N$ multiplication operations in order to obtain beamforming matrices and decoding matrices of all the subcarriers. Therefore, the communication device and the method thereof disclosed in the present invention can remarkably reduce the calculation amount needed to obtain beamforming matrices and decoding matrices of all the subcarriers.

As described above, by use of an interpolation approach, the present invention solves the problem of the prior art that SVD operations must be performed on channel matrices of all subcarriers to cause a huge calculation amount. In more detail, the present invention performs SVD operations on only channel matrices of selected subcarriers to obtain beamforming matrices and decoding matrices of the selected subcarriers. Then, by use of the SVD operation results (i.e., the beamforming matrices and decoding matrices of the selected subcarriers), the interpolation approach is applied to derive SVD operation results (beamforming matrices and decoding matrices of unselected subcarriers) of the unselected subcarriers. Consequently, this may effectively reduce the calculation burden of the MIMO-OFDM system in performing the SVD operations, thereby sharpening the competitive edge of communication devices of the MIMO-OFDM system in the market.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication device adopted for a multi-input multi-output orthogonal frequency division multiplexing (MIMO-OFDM) system, the MIMO-OFDM system comprising the communication device and a corresponding communication device that communicates with the communication device, the communication device comprising:
   a transceiving module, being configured to receive a channel state information (CSI) from the corresponding communication device, wherein the CSI comprises a first CSI of a first subcarrier and a second CSI of a second subcarrier;
   a singular value decomposition (SVD) operation module, being configured to perform a matrix SVD operation on a first channel matrix representing the first CSI to obtain a first beamforming matrix, a first singular value matrix and a first decoding matrix, and configured to perform a matrix SVD operation on a second channel matrix representing the second CSI to obtain a second beamforming matrix, a second singular value matrix and a second decoding matrix; and
   an interpolation operation module, being configured to perform an interpolation operation on the first beamforming matrix and the second beamforming matrix to obtain a third beamforming matrix of a third subcarrier that is located between the first subcarrier and the second subcarrier, and configured to perform an interpolation operation on the first decoding matrix and the second decoding matrix to obtain a third decoding matrix of the third subcarrier.

2. The communication device as claimed in claim 1, further comprising:
   a correlation operation module, being configured to calculate a correlation coefficient between the first CSI and the second CSI according to the first channel matrix and the second channel matrix;
   wherein the interpolation operation module is configured to perform the interpolation operation on the first beamforming matrix and the second beamforming matrix according to the correlation coefficient, perform an interpolation operation on the first singular value matrix and the second singular value matrix according to the correlation coefficient, and perform the interpolation operation on the first decoding matrix and the second decoding matrix according to the correlation coefficient.

3. The communication device as claimed in claim 2, wherein the interpolation operation module is further configured to calculate a beamforming phase rotation matrix according to the first beamforming matrix and the second beamforming matrix, and then perform a matrix multiplication operation on the first beamforming matrix and the beamforming phase rotation matrix to obtain a result for use as the third beamforming matrix, and the interpolation operation module is further configured to calculate a decoding phase rotation matrix according to the first decoding matrix and the second decoding matrix, and then perform a matrix multiplication operation on the first decoding matrix and the decoding phase rotation matrix to obtain a result for use as the third decoding matrix.

4. The communication device as claimed in claim 3, further comprising a determination module, wherein when the determination module determines that the correlation coefficient is less than a specific value, the interpolation operation module is further configured to calculate a permutation matrix and perform a matrix multiplication operation on the third beamforming matrix and the permutation matrix to update the third beamforming matrix, and the interpolation operation module is further configured to perform a matrix multiplication operation on the third decoding matrix and the permutation matrix to update the third decoding matrix.

5. The communication device as claimed in claim 2, wherein the interpolation operation module is further configured to calculate a beamforming phase rotation matrix according to the first beamforming matrix and the second beamforming matrix, and then perform a matrix multiplication operation on the second beamforming matrix and the beamforming phase rotation matrix to obtain a result for use as the third beamforming matrix, and the interpolation operation module is further configured to calculate a decoding phase rotation matrix according to the first decoding matrix and the second decoding matrix, and then perform a matrix multiplication operation on the second decoding matrix and the decoding phase rotation matrix to obtain a result for use as the third decoding matrix.

6. The communication device as claimed in claim 5, further comprising a determination module, wherein when the determination module determines that the correlation coefficient is less than a specific value, the interpolation operation module is further configured to calculate a permutation matrix and perform a matrix multiplication operation on the third beamforming matrix and the permutation matrix to update the third beamforming matrix, and the interpolation operation module is further configured to perform a matrix multiplication operation on the third decoding matrix and the permutation matrix to update the third decoding matrix.

7. The communication device as claimed in claim 2, wherein the correlation operation module is further configured to calculate the correlation coefficient according to the first beamforming matrix of the first channel matrix and the second beamforming matrix of the second channel matrix.

8. The communication device as claimed in claim 7, wherein the correlation operation module is further configured to perform a matrix inner product operation on the first beamforming matrix and the second beamforming matrix to generate a correlation matrix, wherein the correlation coefficient comprises a plurality of diagonal elements of the correlation matrix.

9. The communication device as claimed in claim 2, wherein the correlation operation module is further configured to calculate the correlation coefficient according to the first decoding matrix of the first channel matrix and the second decoding matrix of the second channel matrix.

10. The communication device as claimed in claim 9, wherein the correlation operation module is further configured to perform a matrix inner product operation on the first decoding matrix and the second decoding matrix to generate a correlation matrix, wherein the correlation coefficient comprises a plurality of diagonal elements of the correlation matrix.

11. A method of a communication device adopted for an MIMO-OFDM system, the MIMO-OFDM system comprising the communication device and a corresponding communication device that communicates with the communication device, the communication device comprising a transceiving module, a SVD operation module and an interpolation operation module, the method comprising the following steps of:
   (a) enabling the transceiving module to receive a CSI from the corresponding communication device, wherein the CSI comprises a first CSI of a first subcarrier and a second CSI of a second subcarrier;
   (b) enabling the SVD operation module to perform a matrix SVD operation on a first channel matrix representing the first CSI to obtain a first beamforming matrix, a first singular value matrix and a first decoding matrix;
   (c) enabling the SVD operation module to perform a matrix SVD operation on a second channel matrix representing the second CSI to obtain a second beamforming matrix, a second singular value matrix and a second decoding matrix;
   (d) enabling the interpolation operation module to perform an interpolation operation on the first beamforming matrix and the second beamforming matrix to obtain a third beamforming matrix of a third subcarrier located between the first subcarrier and the second subcarrier; and
   (e) enabling the interpolation operation module to perform an interpolation operation on the first decoding matrix and the second decoding matrix to obtain a third decoding matrix of the third subcarrier.

12. The method as claimed in claim 11, wherein the communication device further comprises a correlation operation module, the method further comprising the following step of:
   (f) prior to the step (d) and the step (e), enabling the correlation operation module to calculate a correlation coefficient between the first CSI and the second CSI according to the first channel matrix and the second channel matrix;
   wherein the step (d) is to perform an interpolation operation on the first beamforming matrix and the second beamforming matrix according to the correlation coefficient, and the step (e) is to perform an interpolation operation on the first decoding matrix and the second decoding matrix according to the correlation coefficient.

13. The method as claimed in claim 12, wherein the step (d) comprises the following steps of:
   enabling the interpolation operation module to calculate a beamforming phase rotation matrix according to the first beamforming matrix and the second beamforming matrix; and
   enabling the interpolation operation module to perform a matrix multiplication operation on the first beamforming matrix and the beamforming phase rotation matrix to obtain the third beamforming matrix.

14. The method as claimed in claim 13, wherein the step (e) comprises the following steps of:
   enabling the interpolation operation module to calculate a decoding phase rotation matrix according to the first decoding matrix and the second decoding matrix; and
   enabling the interpolation operation module to perform a matrix multiplication operation on the first decoding matrix and the decoding phase rotation matrix to obtain the third decoding matrix.

15. The method as claimed in claim 14, wherein the communication device further comprises a determination module, the method further comprising the following steps of:
   enabling the determination module to determine that the correlation coefficient is less than a specific value;
   enabling the interpolation operation module to calculate a permutation matrix;
   enabling the interpolation operation module to perform a matrix multiplication operation on the third beamforming matrix and the permutation matrix to update the third beamforming matrix; and
   enabling the interpolation operation module to perform a matrix multiplication operation on the third decoding matrix and the permutation matrix to update the third decoding matrix.

16. The method as claimed in claim 12, wherein the step (d) comprises the following steps of:
   enabling the interpolation operation module to calculate a beamforming phase rotation matrix according to the first beamforming matrix and the second beamforming matrix; and
   enabling the interpolation operation module to perform a matrix multiplication operation on the second beamforming matrix and the beamforming phase rotation matrix to obtain the third beamforming matrix.

17. The method as claimed in claim 16, wherein the step (e) comprises the following steps of:
   enabling the interpolation operation module to calculate a decoding phase rotation matrix according to the first decoding matrix and the second decoding matrix; and
   enabling the interpolation operation module to perform a matrix multiplication operation on the second decoding matrix and the decoding phase rotation matrix to obtain the third decoding matrix.

18. The method as claimed in claim 17, wherein the communication device further comprises a determination module, the method further comprising the following steps of:
   enabling the determination module to determine that the correlation coefficient is less than a specific value;
   enabling the interpolation operation module to calculate a permutation matrix;
   enabling the interpolation operation module to perform a matrix multiplication operation on the third beamforming matrix and the permutation matrix to update the third beamforming matrix; and
   enabling the interpolation operation module to perform a matrix multiplication operation on the third decoding matrix and the permutation matrix to update the third decoding matrix.

19. The method as claimed in claim 12, wherein the step (f) is further to enable the correlation operation module to calculate the correlation coefficient according to the first beamforming matrix of the first channel matrix and the second beamforming matrix of the second channel matrix.

20. The method as claimed in claim 19, wherein the step (f) is further to enable the correlation operation module to perform a matrix inner product operation on the first beamforming matrix and the second beamforming matrix to generate a correlation matrix, wherein the correlation coefficient comprises a plurality of diagonal elements of the correlation matrix.

21. The method as claimed in claim 12, wherein the step (f) is further to enable the correlation operation module to calculate the correlation coefficient according to the first decoding matrix of the first channel matrix and the second decoding matrix of the second channel matrix.

22. The method as claimed in claim 21, wherein the step (f) is further to enable the correlation operation module to perform a matrix inner product operation on the first decoding matrix and the second decoding matrix to generate a correlation matrix, wherein the correlation coefficient comprises a plurality of diagonal elements of the correlation matrix.

* * * * *